(12) United States Patent
Ebisuzaki et al.

(10) Patent No.: US 10,854,880 B2
(45) Date of Patent: Dec. 1, 2020

(54) ALL-SOLID-STATE BATTERY

(71) Applicant: TOYOTA JIDOSHA KABUSHIKI KAISHA, Toyota (JP)

(72) Inventors: Hideyo Ebisuzaki, Toyota (JP); Hideaki Nishimura, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 16/149,252

(22) Filed: Oct. 2, 2018

(65) Prior Publication Data

US 2019/0123355 A1   Apr. 25, 2019

(30) Foreign Application Priority Data

Oct. 20, 2017  (JP) .................................. 2017-203292

(51) Int. Cl.
| | |
|---|---|
| *H01M 4/62* | (2006.01) |
| *H01M 10/0525* | (2010.01) |
| *H01M 10/42* | (2006.01) |
| *H01M 10/058* | (2010.01) |
| *H01M 10/04* | (2006.01) |

(Continued)

(52) U.S. Cl.
CPC ............. *H01M 4/62* (2013.01); *H01M 4/131* (2013.01); *H01M 4/366* (2013.01); *H01M 10/0468* (2013.01); *H01M 10/0481* (2013.01); *H01M 10/052* (2013.01); *H01M 10/058* (2013.01); *H01M 10/0525* (2013.01);

(Continued)

(58) Field of Classification Search
CPC ......... H01M 10/4235; H01M 10/0562; H01M 10/0468
See application file for complete search history.

(56) References Cited

U.S. PATENT DOCUMENTS

2008/0241684 A1* 10/2008 Muraoka ............... H01M 4/667
429/209
2015/0303484 A1   10/2015 Iida et al.
(Continued)

FOREIGN PATENT DOCUMENTS

| JP | 2018-014286 A | 1/2018 |
|---|---|---|
| WO | 2014/077384 A1 | 5/2014 |

*Primary Examiner* — Kenneth J Douyette
(74) *Attorney, Agent, or Firm* — Oliff PLC

(57) ABSTRACT

An all-solid-state battery including a laminated body with a cathode current collecting layer, cathode active material layer, solid electrolyte layer, anode active material layer, and anode current collecting layer in this order, and a restraining member that applies a restraining pressure to the laminated body in a laminated direction; containing a conductive material, an insulating inorganic substance, and a polymer, is in at least one of a position between the cathode active material layer and the cathode current collecting layer, and a position between the anode active material layer and the anode current collecting layer; the content of the insulating inorganic substance in the PTC layer is 10 volume % or more and 40 volume % or less; and a proportion of a particle size $D_{90}$ of the insulating inorganic substance, $D_{90}$, to a thickness of the PTC layer, $T_{PTC}$, regarded as $D_{90}/T_{PTC}$ is 0.6 or more and 1.0 or less.

9 Claims, 1 Drawing Sheet

(51) Int. Cl.
*H01M 4/131* (2010.01)
*H01M 4/36* (2006.01)
*H01M 10/0562* (2010.01)
*H01M 10/052* (2010.01)
*H01M 10/0585* (2010.01)

(52) U.S. Cl.
CPC ... *H01M 10/0562* (2013.01); *H01M 10/0585* (2013.01); *H01M 10/4235* (2013.01); *H01M 2200/106* (2013.01)

(56) References Cited

U.S. PATENT DOCUMENTS

2016/0351952 A1* 12/2016 Ohtomo ............ H01M 10/0525
2018/0026301 A1 1/2018 Ebisuzaki et al.

* cited by examiner

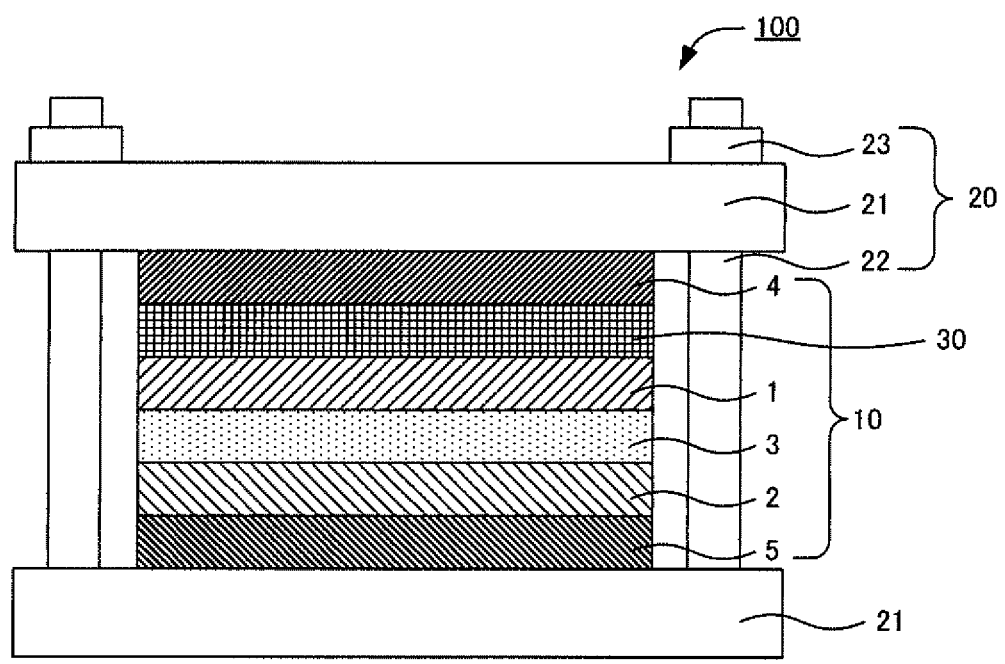

ALL-SOLID-STATE BATTERY

TECHNICAL FIELD

The present disclosure relates to an all-solid-state battery.

BACKGROUND ART

In accordance with a rapid spread of information relevant apparatuses and communication apparatuses such as a personal computer, a video camera and a portable telephone in recent years, the development of a battery to be used as a power source thereof has been emphasized. The development of a high-output and high-capacity battery for an electric automobile or a hybrid automobile has been advanced also in the automobile industry.

Conventionally, various technologies for improving safety such as technologies for preventing temperature rise during short circuits and misuses, and technologies for preventing short circuits, have been thought for the presently developed batteries.

For example, Patent Literature 1 discloses a lithium secondary battery comprising a conductive layer including a conductive material, an inorganic non-conductive material, and a binder material, located between a current collector and an active material layer. Patent Literature 1 discloses a use of the conductive material as a PTC layer. Also, Patent Literature 1 describes a use of the conductive layer as a PTC layer of a liquid-based battery.

CITATION LIST

Patent Literature

Patent Literature 1: WO 2014/077384

SUMMARY OF DISCLOSURE

Technical Problem

For example, when a PTC layer including a conductive material, an insulating inorganic substance, and a polymer is applied to an all-solid-state battery to which the restraining pressure is applied in the laminated direction, it may be difficult to sufficiently increase the electron resistance at high temperature in some cases, if the content of the insulating inorganic substance in the PTC layer is relatively small. The present disclosure has been made in view of the above circumstances, and a main object thereof is to provide an all-solid-state battery in which the electron resistance at high temperature can be increased even when the content of the insulating inorganic substance in the PTC layer is relatively small.

Solution to Problem

In order to achieve the object, provided is an all-solid-state battery comprising: a laminated body provided with a cathode current collecting layer, a cathode active material layer, a solid electrolyte layer, an anode active material layer, and an anode current collecting layer in this order, and a restraining member that applies a restraining pressure to the laminated body in a laminated direction; wherein a PTC layer containing a conductive material, an insulating inorganic substance, and a polymer, is provided in at least one of a position between the cathode active material layer and the cathode current collecting layer, and a position between the anode active material layer and the anode current collecting layer; the content of the insulating inorganic substance in the PTC layer is 10 volume % or more and 40 volume % or less; and a proportion of a particle size $D_{90}$ of the insulating inorganic substance, $D_{90}$, to a thickness of the PTC layer, $T_{PTC}$, regarded as $D_{90}/T_{PTC}$ is 0.6 or more and 1.0 or less.

According to the present disclosure, the PTC layer is provided so as to allow an all-solid-state battery in which the electron resistance at high temperature can be increased even when the content of the insulating inorganic substance in the PTC layer is relatively small.

In the disclosure, the proportion of the particle size $D_{90}$ of the insulating inorganic substance to the thickness of the PTC layer is preferably 0.8 or less. An all-solid-state battery whose electron resistance in normal use is low may be obtained.

Advantageous Effects of Disclosure

The present disclosure exhibits an effect such as to provide an all-solid-state battery in which the electron resistance at high temperature can be increased even when the content of the insulating inorganic substance in the PTC layer is relatively small.

BRIEF DESCRIPTION OF DRAWING

FIG. 1 is a schematic cross-sectional view illustrating an example of the all-solid-state battery of the present disclosure.

DESCRIPTION OF EMBODIMENTS

The all-solid-state battery of the present disclosure is hereinafter described in detail.

FIG. 1 is a schematic cross-sectional view illustrating an example of the all-solid-state battery of the present disclosure. All-solid-state battery 100 illustrated in FIG. 1 has laminated body 10 provided with cathode current collecting layer 4, cathode active material layer 1, solid electrolyte layer 3, anode active material layer 2, and anode current collecting layer 5 in this order; and restraining member 20 that applies a restraining pressure to laminated body 10 in the laminated direction. Also, all-solid-state battery 100 further contains PTC layer 30 between cathode active material layer 1 and cathode current collecting layer 4. PTC layer 30 contains a conductive material, an insulating inorganic substance, and a polymer. The content of the insulating inorganic substance in PTC layer 30 illustrated in FIG. 1 is 10 volume % or more and 40 volume % or less. Also, the proportion of a particle size $D_{90}$ of the insulating inorganic substance, $D_{90}$, to a thickness of PTC layer 30, $T_{PTC}$, regarded as $D_{90}/T_{PTC}$ is 0.6 or more and 1.0 or less.

Restraining member 20 has two plate parts 21 that sandwich the upper and bottom surfaces of laminated body 10, pillar parts 22 that link the two plate parts 21, and controlling parts 23 that are connected to pillar parts 22 to control the restraining pressure by a structure such as a screw structure.

Here, "PTC" refers to "Positive Temperature Coefficient". "PTC layer" refers to a layer provided with PTC properties that change the electron resistance to have a positive coefficient in accordance with the temperature rise.

Also, "particle size $D_{90}$ of an insulating inorganic substance" refers to the particle size that is 90% when cumulated from smaller side in measuring the particle size distribution of the insulating inorganic substance.

According to the present disclosure, the PTC layer is provided so as to allow an all-solid-state battery in which the electron resistance at high temperature can be increased even when the content of the insulating inorganic substance in the PTC layer is relatively small. That is, according to the present disclosure, an all-solid-state battery provided with a PTC layer exhibiting excellent PTC properties may be obtained.

As described above, for example, when a PTC layer including a conductive material, an insulating inorganic substance, and a polymer is applied to an all-solid-state battery to which the restraining pressure is applied in the laminated direction, it may be difficult to sufficiently increase the electron resistance at high temperature (the electron resistance in a high temperature condition) in some cases, if the content of the insulating inorganic substance in the PTC layer is relatively small.

The reason therefor is presumed as follows. When the temperature of the all-solid-state battery is raised, the volume of the polymer in the PTC layer is expanded so that the electron resistance is increased due to the increase of the distance between the conductive materials. That is, the PTC properties are exhibited. Meanwhile, when the temperature of the all-solid-state battery is raised, the polymer in the PTC layer is melted so as to be easily deformed and flowed.

Since a compressing weight (restraining pressure) is applied to the PTC layer from the restraining member, the distance between the conductive materials is shortened by the melted polymer being deformed and flowed so that the electron resistance is decreased due to the reconduction between the conductive materials to each other. That is, the PTC properties disappear.

By the way, the insulating inorganic substance included in the PTC layer has a function of suppressing the compression of the PTC layer by the restraining pressure. However, when the content of the insulating inorganic substance in the PTC layer is relatively small, the compression of the PTC layer by the restraining pressure cannot be sufficiently suppressed so that the conductive materials are easily reconducted to each other. Therefore, when the content of the insulating inorganic substance in the PTC layer is relatively small, it is presumed to be difficult to suppress the reconduction between the conductive materials to each other (to increase the electron resistance at high temperature).

In contrast, the present inventors have focused on the relationship between the thickness of the PTC layer and the particle size of the insulating inorganic substance, and have found out that the electron resistance at high temperature may be sufficiently increased even when the content of the insulating inorganic substance is relatively small, by making the proportion of the particle size $D_{90}$ of the insulating inorganic substance, $D_{90}$, to the thickness of the PTC layer, $T_{PTC}$, regarded as $D_{90}/T_{PTC}$ to be in a predetermined range.

The reason therefor is presumed as follows. In the present disclosure, $D_{90}/T_{PTC}$ is made to be in a predetermined range. That is, the particle size $D_{90}$ of the insulating inorganic substance is sufficiently large. Therefore, it is capable of suppressing the compression of the PTC layer by the restraining pressure from the restraining member, even when the content of the insulating inorganic substance is relatively small. As the result, it is presumed that the decrease in the electron resistance may be suppressed since the reconduction of the conductive materials due to the deformation and the flowage of the polymer may be suppressed.

Incidentally, Patent Literature 1 discloses a PTC layer including a conductive material, an insulating inorganic substance and a polymer. However, the PTC layer is used as a PTC layer of a liquid-based battery in Example, and the use as a PTC layer of an all-solid-state battery is not disclosed. Incidentally, in Example of Patent Literature 1, $D_{90}/T_{PTC}$ is about 0.1 to 0.3.

The all-solid-state battery is hereinafter described in each constitution.

1. PTC Layer

The PTC layer in the present disclosure is placed in at least one of the position between the cathode active material layer and the cathode current collecting layer, and a position between the anode active material layer and the anode current collecting layer. Also, the PTC layer contains a conductive material, an insulating inorganic substance, and a polymer.

In the present disclosure, the proportion of the particle size $D_{90}$ of the insulating inorganic substance, $D_{90}$, to the thickness of the PTC layer, $T_{PTC}$, regarded as $D_{90}/T_{PTC}$ is 0.6 or more, for example, and may be 0.7 or more. Also, the $D_{90}/T_{PTC}$ is 1.0 or less, may be 0.9 or less, and may be 0.8 or less. Above all, in the present disclosure, the $D_{90}/T_{PTC}$ is preferably 0.8 or less. The reason therefor is to decrease the electron resistance of the PTC layer in normal use.

The thickness of the PTC layer in the present disclosure varies greatly with the constitution of a battery, and thus is not particularly limited. The thickness of the PTC layer may be, for example, 1 μm or more, may be 2 μm or more, and may be 5 μm or more. Also, the thickness of the PTC layer may be, for example, 200 μm or less, may be 100 μm or less, and may be 50 μm or less.

Incidentally, the thickness of the PTC layer, $T_{PTC}$ in the present disclosure is the average thickness, and may be measured, for example, by using a thickness measuring device. Also, the thickness of the PTC layer may be measured from the observation image of a cross-section surface of the PTC layer with SEM (scanning electron microscope).

(1) Insulating Inorganic Substance

The insulating inorganic substance used in the present disclosure has a function of suppressing the compression of the PTC layer by the restraining pressure. The insulating inorganic substance is usually a granular shape. The insulating inorganic substance may be a primary particle and may be a secondary particle.

As to the insulating inorganic substance in the present disclosure, the proportion of the particle size $D_{90}$ of the insulating inorganic substance to the thickness of the PTC layer is in a predetermined range. The particle size $D_{90}$ of the insulating inorganic substance is appropriately selected according to the thickness of the PTC layer, and thus is not particularly limited. The particle size $D_{90}$ of the insulating inorganic substance may be, for example, 0.1 μm or more, may be 0.5 μm or more, and may be 1 μm or more. Also the particle size $D_{90}$ of the insulating inorganic substance may be, for example, 50 μm or less, may be 20 μm or less, and may be 10 μm or less.

Incidentally, "the particle size $D_{90}$ of the insulating inorganic substance is a predetermined value" means that, out of all the particles of the insulating inorganic substance, the particle size of the insulating inorganic substance of 10% (abundance ratio) is a predetermined value or more.

Also, the average particle size ($D_{50}$) of the insulating inorganic substance may be, for example, 50 nm or more and 5 μm or less, and may be 100 nm or more and 2 μm or less. The average particle size ($D_{50}$) of the insulating inorganic substance refers to a particle size that is 50% when cumulated from smaller side in measuring the particle size distribution of the insulating inorganic substance. Incidentally, the particle size $D_{50}$ and $D_{90}$ of the insulating inorganic substance in the present disclosure may be measured, for example, by using a particle size distribution measuring device based on a laser diffraction-scattering method.

The distribution of the particles of the insulating inorganic substance is not particularly limited. The distribution of the particles of the insulating inorganic substance may exhibit a normal distribution when exhibited in, for example, a frequency distribution.

The insulating inorganic substance in the present disclosure is not particularly limited if the substance has insulating properties and the melting point thereof is higher than the melting point of the later described polymer. Examples thereof may include a metal oxide and a metal nitride. Examples of the metal oxide may include alumina, zirconia, and silica, and examples of the metal nitride may include silicon nitride. Additional example of the insulating inorganic substance may include ceramic materials.

The content of the insulating inorganic substance in the PTC layer is 10 volume % or more, and may be 20 volume % or more. Also, the content of the insulating inorganic substance in the PTC layer is 40 volume % or less, and may be 30 volume % or less. If the content of the insulating inorganic substance is too small, it may be difficult to sufficiently suppress the compression of the PTC layer by the restraining pressure. Meanwhile, if the content of the insulating inorganic substance is too large, the content of the polymer decreases comparatively so that the distance between the conductive materials may not be lengthened by the polymer expanded in volume, and thus the increase in the electron resistance may be insufficient. Also, the conducting path to be formed by the conductive material would be interfered by the insulating inorganic substance and thus the electron conductivity of the PTC layer may decrease in normal use.

Also, the proportion of the content of the insulating inorganic substance to the total content of the insulating inorganic substance and the polymer in the PTC layer may be, for example, 10 volume % or more, and may be 20 volume % or more. Also, the proportion of the content of the insulating inorganic substance to the total content of the insulating inorganic substance and the polymer in the PTC layer may be, for example, 45 volume % or less, and may be 40 volume % or less.

(2) Conductive Material

The conductive material is not limited to any particular material if it has the desired electron conductivity, and examples thereof may include carbon materials. Examples of the carbon material may include carbon blacks such as furnace black, acetylene black, Ketjen black, and thermal black; carbon fibers such as carbon nanotube and carbon nanofiber; and activated carbon, carbon, graphite, graphene, and fullerene. Above all, it is preferable to use the carbon black. The reason therefor is that the carbon black has an advantage of high electron conductivity relative to the addition amount. The conductive material is not limited to any particular shape, and examples thereof may include a granular shape. The average primary particle size of the conductive material is, for example, preferably 10 nm or more and 200 nm or less, and more preferably 15 nm or more and 100 nm or less. Here, the average primary particle size of the conductive material may be, for example, calculated by measuring primary particle sizes of 30 pieces or more of conductive materials based on the image analysis using an electron microscope such as SEM (scanning electron microscope); an arithmetic mean of them may be adopted as the value for the average primary particle size.

The content of the conductive material in the PTC layer is preferably, for example, 8 volume % or more, and more preferably 10 volume % or more. Also, the content of the conductive material in the PTC layer is preferably, for example, 50 volume % or less, and more preferably 30 volume % or less. If the content of the conductive material is too small, the conducting path to be formed may decrease and thus the electron conductivity of the PTC layer may decrease. Also, if the content of the conductive material is too large, the distance between the conductive materials may not be lengthened by the volume expansion of the polymer, and thus the increase in the electron resistance may be insufficient.

(3) Polymer

The polymer is not limited if it may be expanded in volume during the temperature rise, and examples thereof may include thermoplastic resins. Examples of the thermoplastic resin may include polyvinylidene fluoride (PVDF), polypropylene, polyethylene, polyvinyl chloride, polystyrene, an acrylonitrile-butadiene-styrene (ABS) resin, a methacrylic resin, polyamide, polyester, polycarbonate, and polyacetal.

The melting point of the polymer may be the temperature higher than the temperature during the normal use of the battery. For example, the melting point is preferably 80° C. or more and 300° C. or less, and more preferably 100° C. or more and 250° C. or less. The melting point may be, for example, measured by a differential thermal analysis (DTA).

The content of the polymer in the PTC layer may be, for example, 40 volume % or more, and may be 50 volume % or more. Also, the content of the polymer in the PTC layer may be, for example, 80 volume % or less, and may be 70 volume % or less. If the content of the polymer is too small, the distance between the conductive materials may not be lengthened by the polymer expanded in volume, and thus the increase in the electron resistance may be insufficient. If the content of the polymer is too large, the conducting path to be formed by the conductive material would be interfered by the polymer and thus the electron conductivity of the PTC layer may decrease.

Also, when the volume of the PTC layer is regarded as X and the volume of the polymer included in the PTC layer is regarded as Y, it is preferable that $(X-Y)/Y$ is 1.5 or more. The content ratio of the polymer in the PTC layer being in the range may inhibit the deformation and the flowage of the polymer melted during the temperature rise.

(4) Method for Forming PTC Layer

The method for forming the PTC layer is not limited to any particular method if the method allows the above described PTC layer to be obtained. Examples thereof may include a method of forming the PTC layer by mixing the above described conductive material, insulating inorganic substance, and polymer with an organic solvent such as N-methylpyrrolidone to form the paste, coating the current collecting layer with the paste, and drying the paste.

2. Laminated Body

The laminated body in the present disclosure has a constitution provided with a cathode current collecting layer, a cathode active material layer, a solid electrolyte layer, an anode active material layer, and an anode current collecting layer in this order.

(1) Cathode Active Material Layer

The cathode active material layer is a layer containing at least a cathode active material. Also, the cathode active material layer may further contain at least one of a solid electrolyte material, a conductive material, and a binder other than the cathode active material.

As the cathode active material, cathode active materials applicable to all-solid-state batteries may be appropriately used. Examples of such a cathode active material may include rock salt bed type active materials such as lithium cobalt oxide ($LiCoO_2$), lithium nickel oxide ($LiNiO_2$), and $LiNi_{1/3}Co_{1/3}Mn_{1/3}O_2$, spinel type active materials such as lithium manganese oxide ($LiMn_2O_4$) and $Li(Ni_{0.5}Mn_{1.5})O_4$, lithium titanium oxide ($Li_4Ti_5O_{12}$), and olivine type active materials such as $LiFePO_4$, $LiMnPO_4$, $LiCoPO_4$, and $LiNiPO_4$. The shape of the cathode active material may be, for example, a granular shape and a thin film shape. If the cathode active material is in a granular shape, the cathode active material may be a primary particle and may be a secondary particle. Also, the average particle size ($D_{50}$) of the cathode active material is, for example, preferably 1 nm or more and 100 μm or less, and more preferably 10 nm or more and 30 μm or less.

The solid electrolyte material is not limited to any particular material if the material has ion conductivity, and examples thereof may include inorganic solid electrolyte materials such as sulfide solid electrolyte materials and oxide solid electrolyte materials. In the present disclosure, it is preferable to use the sulfide solid electrolyte material as the solid electrolyte material. The sulfide solid electrolyte material could generate hydrogen sulfide due to the temperature rise although it has high ion conductivity. Accordingly, increasing the electron resistance using the PTC layer to effectively inhibit the temperature rise may result in inhibiting the generation of hydrogen sulfide and allowing the battery to have high ion conductivity. Examples of the sulfide solid electrolyte material may include $Li_2S$—$SiS_2$, LiI—$Li_2S$—$SiS_2$, LiI—$Li_2S$—$P_2S_5$, LiI—$Li_2O$—$Li_2S$—$P_2S_5$, LiI—$Li_2S$—$P_2O_5$, LiI—$Li_3PO_4$—$P_2S_5$, $Li_2S$—$P_2S_5$, and $Li_3PS_4$.

As the conductive material, the same materials as those described in "1. PTC layer, (2) Conductive material" above may be used. Meanwhile, the binder is not limited to any particular material if it is chemically and electronically stable. Examples thereof may include fluorine based binders such as polyvinylidene fluoride (PVDF) and polytetra fluoroethylene (PTFE).

Also, the content of the cathode active material in the cathode active material layer is preferably larger from the viewpoint of the capacity. For example, the content is 30 mass % or more, preferably 50 mass % or more, and more preferably 70 mass % or more. Also, the thickness of the cathode active material layer is, for example, preferably 0.1 μm or more and 1000 μm or less.

(2) Anode Active Material Layer

The anode active material layer is a layer containing at least an anode active material. Also, the anode active material layer may further contain at least one of a solid electrolyte material, a conductive material, and a binder other than the anode active material.

As the anode active material, known anode active materials capable of absorbing and releasing metal ions may be appropriately used. Examples of such an anode active material may include metal active materials and carbon active materials. Examples of the metal active material may include In, Al, Si, and Sn. On the other hand, examples of the carbon active material may include mesocarbon microbeads (MCMB), highly oriented pyrolytic graphite (HOPG), hard carbon, and soft carbon. The anode active material may be in a shape such as a granular shape and a thin film shape. If the anode active material is in a granular shape, the anode active material may be a primary particle and may be a secondary particle. Also, the average particle size ($D_{50}$) of the anode active material is, for example, preferably 1 nm or more and 100 μm or less, and more preferably 10 nm or more and 30 μm or less.

Regarding the solid electrolyte material, the conductive material and the binder, the same materials as those described in "1. PTC layer, (2) Conductive material" and "2. Laminated body, (1) Cathode active material layer" above may be used. Also, the content of the anode active material in the anode active material layer is preferably larger from the viewpoint of the capacity. For example, the content is 30 mass % or more, preferably 50 mass or more, and more preferably 70 mass or more. Also, the thickness of the anode active material layer is, for example, preferably 0.1 μm or more and 1000 μm or less.

(3) Solid Electrolyte Layer

The solid electrolyte layer is a layer to be formed between the cathode active material layer and the anode active material layer. The solid electrolyte material to be used for the solid electrolyte layer may be the same materials described in "2. Laminated body, (1) Cathode active material layer" above.

Also, the solid electrolyte layer may contain only the solid electrolyte material, and may further contain additional material. Examples of the additional material may include a binder. The binder is similar to those described in "2. Laminated body, (1) Cathode active material layer" above. The thickness of the solid electrolyte layer is, for example, preferably 0.1 μm or more and 1000 μm or less.

(4) Cathode Current Collecting Layer and Anode Current Collecting Layer

For the cathode current collecting layer and the anode current collecting layer, known metals usable as current collectors in an all-solid-state battery may be used. Examples of such a metal may include metal materials that contain one or two elements or more of Cu, Ni, Al, V, Au, Pt, Mg, Fe, Ti, Co, Cr, Zn, Ge, and In. The cathode current collecting layer and the anode current collecting layer are not limited to any particular shape. Examples of the shape may include a foil shape, a mesh shape, and a porous shape.

3. Restraining Member

The restraining member may be known restraining members usable as a restraining member in an all-solid-state battery and capable of applying a restraining pressure to the laminated body provided with a cathode current collecting layer, a cathode active material layer, a solid electrolyte layer, an anode active material layer, and an anode current collecting layer in this order, in the laminated direction. Examples of the restraining member may include the restraining member that has two plate parts to sandwich the upper and bottom surfaces of the laminated body, pillar parts to link the two plate parts, and controlling parts connected to the pillar parts to control the restraining pressure by a structure such as a screw structure. The desired restraining pressure may be applied to the laminated body by the controlling parts.

The restraining pressure is not limited to any particular pressure. For example, the pressure is preferably 0.1 MPa or more, more preferably 1 MPa or more, and further preferably 5 MPa or more. There is an advantage that the contact between each layer may be easily improved by increasing the restraining pressure. Meanwhile, the restraining pressure is, for example, preferably 100 MPa or less, more preferably 50 MPa or less, and further preferably 20 MPa or less. Too large a restraining pressure requires high rigidity of the restraining member, and could cause increase in size of the restraining member.

4. All-Solid-State Battery

The all-solid-state battery of the present disclosure may be a primary battery and may be a secondary battery, but preferably a secondary battery among them. The reason therefor is to repeatedly charge and discharge and be useful as a car mounted battery for example. Also, examples of the shape of the all-solid-state battery may include a coin shape, a laminate shape, a cylindrical shape, and a square shape. Also, the all-solid-state battery of the present disclosure has at least one laminated body, and for example, may have a plurality of laminated bodies in the thickness direction.

Also, the all-solid-state battery of the present disclosure is preferably a lithium battery.

Incidentally, the present disclosure is not limited to the embodiments. The embodiments are exemplification, and other variations are intended to be included in the technical scope of the present disclosure if they have substantially the same constitution as the technical idea described in the claim of the present disclosure and offer similar operation and effect thereto.

EXAMPLES

The present disclosure is hereinafter described in more details with reference to Examples.

Example 1-1

A PTC layer was produced on an aluminum foil by the following procedure. The PTC layer was produced so that the proportion of a particle size $D_{90}$ of the insulating inorganic substance, $D_{90}$, to the thickness of the PTC layer, $T_{PTC}$, regarded as $D_{90}/T_{PTC}$ was 0.6.

First, prepared were furnace black with the average primary particle size of 66 nm (from TOKAI CARBON CO., LTD.) as a conductive material, alumina (particle size $D_{90}$: 6 μm) as an insulating inorganic substance, and PVDF (KF polymer L #9130 from KUREHA CORPORATION) as a polymer, which were mixed with a solvent N-methylpyrrolidone to have the volume ratio of furnace black:alumina:PVDF=10:10:80 and thereby a paste was prepared. After that, a 15 μm thick aluminum foil was coated with the paste, dried in the conditions of 100° C. in a stational drying furnace for 1 hour, and thereby a PTC layer was produced. Incidentally, $T_{PTC}$=10 μm in Example 1-1. The $T_{PTC}$ was similar in each of the following Examples and Comparative Examples.

Examples 1-2 to 1-4, Comparative Examples 1-1 to 1-2

Fixing the volume % of the furnace black to 10 volume %, an aluminum foil provided with a PTC layer was produced in the same manner as in Example 1-1 except that the volume % of the alumina and PVDF were varied. Specific volume ratio of the alumina and PVDF were alumina:PVDF=20:70 (Example 1-2), 30:60 (Example 1-3), 40:50 (Example 1-4), 50:40 (Comparative Example 1-1), and 60:30 (Comparative Example 1-2), respectively.

Example 2-1

A PTC layer was produced in the same manner as in Example 1-1 except that alumina (particle size $D_{90}$: 8 μm) was used as the insulating inorganic substance and that the layer was produced so that $D_{90}/T_{PTC}$ was 0.8.

Examples 2-2 to 2-4, Comparative Examples 2-1 to 2-2

Fixing the volume % of the furnace black to 10 volume %, an aluminum foil provided with a PTC layer was produced in the same manner as in Example 2-1 except that the volume % of the alumina and PVDF were varied. Specific volume ratio of the alumina and PVDF were alumina:PVDF=20:70 (Example 2-2), 30:60 (Example 2-3), 40:50 (Example 2-4), 50:40 (Comparative Example 2-1), and 60:30 (Comparative Example 2-2), respectively.

Example 3-1

A PTC layer was produced in the same manner as in Example 1-1 except that alumina (particle size $D_{90}$: 10 μm) was used as the insulating inorganic substance and that the layer was produced so that $D_{90}/T_{PTC}$ was 1.0.

Examples 3-2 to 3-4, Comparative Examples 3-1 to 3-2

Fixing the volume % of the furnace black to 10 volume %, an aluminum foil provided with a PTC layer was produced in the same manner as in Example 3-1 except that the volume % of the alumina and PVDF were varied. Specific volume ratio of the alumina and PVDF were alumina:PVDF=20:70 (Example 3-2), 30:60 (Example 3-3), 40:50 (Example 3-4), 50:40 (Comparative Example 3-1), and 60:30 (Comparative Example 3-2), respectively.

Comparative Example 4-1

A PTC layer was produced in the same manner as in Example 1-1 except that alumina (particle size $D_{90}$: 2 μm) was used as the insulating inorganic substance and that the layer was produced so that $D_{90}/T_{PTC}$ was 0.2.

Comparative Examples 4-2 to 4-6

Fixing the volume % of the furnace black to 10 volume %, an aluminum foil provided with a PTC layer was produced in the same manner as in Comparative Example 4-1 except that the volume % of the alumina and PVDF were varied. Specific volume ratio of the alumina and PVDF were alumina:PVDF=20:70 (Comparative Example 4-2), 30:60 (Comparative Example 4-3), 40:50 (Comparative Example 4-4), 50:40 (Comparative Example 4-5), and 60:30 (Comparative Example 4-6), respectively.

Comparative Example 5-1

A PTC layer was produced in the same manner as in Example 1-1 except that alumina (particle size $D_{90}$: 4 μm) was used as the insulating inorganic substance and that the layer was produced so that $D_{90}/T_{PTC}$ was 0.4.

Comparative Examples 5-2 to 5-6

Fixing the volume % of the furnace black to 10 volumed, an aluminum foil provided with a PTC layer was produced in the same manner as in Comparative Example 5-1 except that the volume % of the alumina and PVDF were varied. Specific volume ratio of the alumina and PVDF were alumina:PVDF=20:70 (Comparative Example 5-2), 30:60 (Comparative Example 5-3), 40:50 (Comparative Example 5-4), 50:40 (Comparative Example 5-5), and 60:30 (Comparative Example 5-6), respectively.

[Evaluation]

(Measurement of Electron Resistance on Heating)

The measurement of electron resistance on heating was conducted for the aluminum foil provided with the PTC layer obtained in each Example and Comparative Example.

Specifically, the produced aluminum foil provided with the PTC layer was punched into a circle shape with the diameter of 11.28 cm, pinched with cylindrical terminals of the same diameter, and the restraining pressure of 10 MPa was applied to between the terminals. Next, the aluminum foil provided with the PTC layer pinched with the terminals was disposed in a thermostatic oven, heated to 200° C., the temperature was maintained for 1 hour, and the electron resistance was measured at that point. Constant current of 1 mA was conducted to between the terminals to measure the electron resistance, and the value of the electron resistance was calculated by measuring the voltage between the terminals. The results are shown in Table 1.

then decreased. It is presumed that this is because the compression of the PTC layer by the restraining pressure could not be suppressed, since the particle size $D_{90}$ of the insulating inorganic substance was relatively small and the content of the insulating inorganic substance was relatively small. It is presumed that, as the result, the electron resistance was decreased since the reconduction of the conductive materials by the deformation and the flowage of the polymer has occurred.

Further, from the results of the measurement of electron resistance on heating, also when $D_{90}/T_{PTC}$ was 0.6, 0.8 and 1.0 respectively, if the content of the insulating inorganic substance exceeds 40 volume % (Comparative Examples 1-1 to 1-2, Comparative Examples 2-1 to 2-2 and Comparative Examples 3-1 to 3-2), it was confirmed that the electron resistance on heating could not be increased sufficiently. It is presumed that this is because the increase of the electron resistance due to the volume expansion of the polymer was less likely to occur, since the content of the polymer in the PTC layer was decreased relatively.

TABLE 1

| Electron resistance on heating ($\Omega \cdot cm^2$) | | $D_{90}/T_{PTC}$ (μm/μm) | | | | |
|---|---|---|---|---|---|---|
| | | 0.2 | 0.4 | 0.6 | 0.8 | 1.0 |
| Content of insulating inorganic substance (volume %) | 10 | 0.2 (Comp. Ex. 4-1) | 0.2 (Comp. Ex. 5-1) | 305 (Example 1-1) | 402 (Example 2-1) | 380 (Example 3-1) |
| | 20 | 0.2 (Comp. Ex. 4-2) | 0.2 (Comp. Ex. 5-2) | 230 (Example 1-2) | 290 (Example 2-2) | 250 (Example 3-2) |
| | 30 | 0.2 (Comp. Ex. 4-3) | 0.2 (Comp. Ex. 5-3) | 165 (Example 1-3) | 190 (Example 2-3) | 170 (Example 3-3) |
| | 40 | 0.2 (Comp. Ex. 4-4) | 0.2 (Comp. Ex. 5-4) | 80 (Example 1-4) | 90 (Example 2-4) | 70 (Example 3-4) |
| | 50 | 50 (Comp. Ex. 4-5) | 49 (Comp. Ex. 5-5) | 48 (Comp. Ex. 1-1) | 50 (Comp. Ex. 2-1) | 50 (Comp. Ex. 3-1) |
| | 60 | 20 (Comp. Ex. 4-6) | 18 (Comp. Ex. 5-6) | 19 (Comp. Ex. 1-2) | 19 (Comp. Ex. 2-2) | 20 (Comp. Ex. 3-2) |

From the results (Table 1) of the measurement of electron resistance on heating, when $D_{90}/T_{PTC}$ was 0.6 (Examples 1-1 to 1-4), $D_{90}/T_{PTC}$ was 0.8 (Examples 2-1 to 2-4), and $D_{90}/T_{PTC}$ was 1.0 (Examples 3-1 to 3-4), it was confirmed that the electron resistance on heating (the electron resistance at high temperature) may be increased even when the content of the insulating inorganic substance in the PTC layer was relatively small. It is presumed that this is because the compression of the PTC layer by the restraining pressure from the restraining member could be suppressed even the content of the insulating inorganic substance was relatively small, since the particle size $D_{90}$ of the insulating inorganic substance was sufficiently large. It is presumed that, as the result, the decrease of the electron resistance could be suppressed since the reconduction of the conductive materials by the deformation and the flowage of the polymer could be suppressed.

Meanwhile, when $D_{90}/T_{PTC}$ was 0.2 (Comparative Examples 4-1 to 4-4), and $D_{90}/T_{PTC}$ was 0.4 (Comparative Examples 5-1 to 5-4), it was confirmed that the electron resistance on heating could not be increased sufficiently. Specifically, when $D_{90}/T_{PTC}$ was 0.2 and 0.4 respectively, and the content of the insulating inorganic substance was 40 volume % or less, the electron resistance once increased, and Meanwhile, when $D_{90}/T_{PTC}$ was 0.2 and when $D_{90}/T_{PTC}$ was 0.4, if the content of the insulating inorganic substance exceeds 40 volume % (Comparative Examples 4-5 to 4-6, and Comparative Examples 5-5 to 5-6), the electron resistance on heating was at the same level as in Comparative Examples 1-1 to 1-2, Comparative Examples 2-1 to 2-2 and Comparative Examples 3-1 to 3-2, even though it was higher compared to the cases in which the content was 40 volume % or less. Also, compared to Examples 1-1 to 1-4, Examples 2-1 to 2-4, and Examples 3-1 to 3-4, the electron resistance on heating was lower. From the results, it was confirmed that, when $D_{90}/T_{PTC}$ was 0.2 and when $D_{90}/T_{PTC}$ was 0.4, if the content of the insulating inorganic substance exceeds 40 volumed, the electron resistance on heating could not be increased sufficiently.

(Measurement of Electron Resistance Before Heating)

The measurement of electron resistance before heating was conducted for the aluminum foil provided with the PTC layer obtained in each Example and Comparative Example. The measurement of electron resistance before heating was carried out by the measuring method similar to that of measurement of electron resistance on heating except that the aluminum foil provided with the PTC layer pinched with the terminals was not disposed in a thermostatic oven. The results are shown in Table 2.

TABLE 2

| Electron resistance before heating ($\Omega \cdot cm2$) | | D90/TPTC (μm/μm) | | | | |
|---|---|---|---|---|---|---|
| | | 0.2 | 0.4 | 0.6 | 0.8 | 1.0 |
| Content of insulating inorganic substance (volume %) | 10 | 0.2 (Comp. Ex. 4-1) | 0.2 (Comp. Ex. 5-1) | 0.2 (Example 1-1) | 0.2 (Example 2-1) | 8.0 (Example 3-1) |
| | 20 | 0.2 (Comp. Ex. 4-2) | 0.2 (Comp. Ex. 5-2) | 0.2 (Example 1-2) | 0.2 (Example 2-2) | 9.5 (Example 3-2) |
| | 30 | 0.2 (Comp. Ex. 4-3) | 0.2 (Comp. Ex. 5-3) | 0.2 (Example 1-3) | 0.2 (Example 2-3) | 9.0 (Example 3-3) |
| | 40 | 0.2 (Comp. Ex. 4-4) | 0.2 (Comp. Ex. 5-4) | 0.2 (Example 1-4) | 0.2 (Example 2-4) | 8.2 (Example 3-4) |
| | 50 | 0.2 (Comp. Ex. 4-5) | 0.2 (Comp. Ex. 5-5) | 0.2 (Comp. Ex. 1-1) | 0.2 (Comp. Ex. 2-1) | 8.0 (Comp. Ex. 3-1) |
| | 60 | 0.2 (Comp. Ex. 4-6) | 0.2 (Comp. Ex. 5-6) | 0.2 (Comp. Ex. 1-2) | 0.2 (Comp. Ex. 2-2) | 10.0 (Comp. Ex. 3-2) |

From the results (Table 2) of the measurement of electron resistance before heating, compared to the case in which $D_{90}/T_{PTC}$ was 1.0 (Examples 3-1 to 3-4), when $D_{90}/T_{PTC}$ was 0.8 or less (Examples 1-1 to 1-4 and Examples 2-1 to 2-4), it was confirmed that the electron resistance before heating (the electron resistance in normal use) was significantly decreased. Compared to the case in which $D_{90}/T_{PTC}$ is 1.0, when $D_{90}/T_{PTC}$ is 0.8 or less, the particle of the insulating inorganic substance whose particle size is larger than the thickness of the PTC layer is less likely included. Therefore, it is presumed that the decrease of the contact points between the terminal and the PTC layer may be suppressed by the insulating inorganic substance being sandwiched between the terminals. It is presumed that, as the result, the conducting path may be secured so that the electron resistance before heating may be decreased.

REFERENCE SIGNS LIST

1 . . . cathode active material layer
2 . . . anode active material layer
3 . . . solid electrolyte layer
4 . . . cathode current collecting layer
5 . . . anode current collecting layer
10 . . . laminated body
20 . . . restraining member
21 . . . plate part
22 . . . pillar part
23 . . . controlling part
30 . . . PTC layer
100 . . . all-solid-state battery

What is claimed is:

1. An all-solid-state battery comprising:
a laminated body provided with a cathode current collecting layer, a cathode active material layer, a solid electrolyte layer, an anode active material layer, and an anode current collecting layer in this order, and
a restraining member that applies a restraining pressure to the laminated body in a laminated direction;
wherein
a PTC layer containing a conductive material, an insulating inorganic substance, and a polymer, is provided in at least one of a position between the cathode active material layer and the cathode current collecting layer, and a position between the anode active material layer and the anode current collecting layer;
a content of the insulating inorganic substance in the PTC layer is 10 volume % or more and 40 volume % or less;
a proportion of a particle size $D_{90}$ of the insulating inorganic substance, $D_{90}$, to a thickness of the PTC layer, $T_{PTC}$, regarded as $D_{90}/T_{PTC}$ is 0.6 or more and 1.0 or less;
the solid electrolyte layer contains inorganic solid electrolyte materials as a solid electrolyte material; and
the restraining pressure is 0.1 MPa or more and 100 MPa or less.

2. The all-solid-state battery according to claim 1, wherein the proportion of the particle size $D_{90}$ of the insulating inorganic substance, $D_{90}$, to the thickness of the PTC layer, $T_{PTC}$, regarded as $D_{90}/T_{PTC}$ is 0.6 or more and 0.8 or less.

3. The all-solid-state battery according to claim 1, wherein the content of the insulating inorganic substance in the PTC layer is 10 volume % or more and 30 volume % or less.

4. The all-solid-state battery according to claim 1, wherein the restraining pressure is 5 MPa or more and 50 MPa or less.

5. The all-solid-state battery according to claim 1, wherein the conductive material is carbon materials.

6. The all-solid-state battery according to claim 1, wherein the insulating inorganic substance is a metal oxide or a metal nitride.

7. The all-solid-state battery according to claim 1, wherein the polymer is thermoplastic resins.

8. The all-solid-state battery according to claim 1, wherein $D_{90}$ is 0.6 μm or more and 50 μm or less.

9. The all-solid-state battery according to claim 1, wherein $T_{PTC}$ is 1 μm or more and 83 μm or less.

* * * * *